Jan. 3, 1956 D. RICHMAN 2,729,702

TELEVISION FIELD-IDENTIFICATION SYSTEM

Filed June 20, 1952 3 Sheets-Sheet 1

INVENTOR.
DONALD RICHMAN
BY Laurence B. Dodds
ATTORNEY

TELEVISION FIELD-IDENTIFICATION SYSTEM

Filed June 20, 1952 3 Sheets-Sheet 2

INVENTOR.
DONALD RICHMAN
BY Laurence B. Dodds
ATTORNEY

TELEVISION FIELD-IDENTIFICATION SYSTEM

Filed June 20, 1952 3 Sheets-Sheet 3

INVENTOR.
DONALD RICHMAN

BY Laurence B. Dodds

ATTORNEY 2,729,702
Patented Jan. 3, 1956

2,729,702

TELEVISION FIELD-IDENTIFICATION SYSTEM

Donald Richman, Flushing, N. Y., assignor to Hazeltine Research, Inc., Chicago, Ill., a corporation of Illinois Application June 20, 1952, Serial No. 294,680

16 Claims. (Cl. 178—69.5)

GENERAL

This invention relates to field-identification systems for conventional television systems of the odd-line interlaced type and, particularly, for color-television systems utilizing such interlacing for determining whether a field being scanned is composed of odd or even lines of scan. The present invention is directed to an improvement in the field-identification systems described in applicant's copending applications Serial Nos. 244,756 and 259,171 filed September 1, 1951, and November 30, 1951, respectively, and both entitled "Television Field-Identification System."

In a form of color-television system more particularly described in an article in Electronics for February 1952, at pages 88–95, inclusive, and entitled "Principles of NTSC Compatible Color Television," color signals individually representative of the primary colors, specifically, green, red, and blue of a color image being televised, are developed at a transmitter and components of these signals are applied as modulation signals to a subcarrier wave signal effectively to modulate the latter signal in a predetermined phase sequence. Conventionally, the modulated subcarrier wave signal has a predetermined frequency less than the highest video frequency and has amplitude and phase characteristics related to the primary colors of the televised image. In a specific form of such system, the subcarrier wave signal is effectively modulated at 120° phase points by successive ones of the three primary color-signal components. At any one time, the green, red, and blue color-signal components may modulate the subcarrier in the order in which they are mentioned. At another time the color-signal components may modulate the subcarrier wave signal at the transmitter in a different phase sequence for the purpose of minimizing the visual effects of cross talk caused by deriving the color-signal components at the receiver at improper phase angles. For example, the green, blue, and red color-signal components may modulate the subcarrier wave signal in that order during one field of scan and in the order of green, red, and blue during the successive field of scan. In addition to the modulated subcarrier wave signal, a signal representative of the brightness and detail information of the image is also developed at the transmitter and combined in an interleaved manner with the modulated subcarrier wave signal to form, in a pass band common to both the brightness and subcarrier wave signals, a resultant signal which is transmitted in a conventional manner.

In general, a receiver in such a system intercepts the transmitted signal and derives therefrom the modulated subcarrier wave signal and the brightness signal. The modulation components of the subcarrier wave signal are then detected by a deriving means which is designed to operate in synchronism and in proper phase relation with the subcarrier wave-signal modulating means at the transmitter. As described in the previously mentioned article on the television system of the National Television Systems Committee, these signals may be effectively derived from the subcarrier wave signal by deriving the quadrature modulation components thereof. It is desired that the deriving means develop at its output circuit color-signal components which correspond in all their important characteristics with the components utilized to modulate the subcarrier wave signal at the transmitter. Furthermore, since components of several color signals modulate the subcarrier wave signal at different phase points, it is particularly important that the deriving means at the receiver operate in proper phase relationship with respect to a predetermined phase of the modulating means at the transmitter. The color-signal components derived at the receiver are combined with the brightness signal to reproduce on the image-reproducing device of the receiver a color image corresponding to the image being televised at the transmitter.

In such a receiver, the phase sequence in which the color-signal components are derived is changed periodically in synchronism with a corresponding change at the transmitter. The color-signal components effectively are derived in the one phase sequence during one group of scanning fields, for example, in the sequence green, red, and blue. During another group of scanning fields interlaced with the first-mentioned group, the color-signal components are derived in another phase sequence, for example, in the sequence green, blue and red. Therefore, in order that the color-signal deriving means in the receiver be properly controlled to derive the color-signal components in the proper phase sequence, it is desirable to develop a control effect representative of the change from one sequence to another and indicative of the sequence which should be employed at any given time. Since these sequence changes occur in relation to the fields being scanned, if the fields can be identified as odd-line or even-line fields, then a control effect may be developed to define such fields and the type lines therein. Such a control effect can then be utilized to assure that the proper phase sequence occurs during the identified field. In this manner, if such synchronizing of the phase sequence of the transmitter and receiver occurs on identified fields, then between such identification periods the phase sequence may be changed at field frequency with some assurance that the color-signal deriving means in the receiver is operating in synchronism with the color-signal modulating means at the transmitter.

The copending application Serial No. 244,756, previously referred to herein, describes a field-identification system which accomplishes the result just discussed. Though the system described in that application is generally suitable to effect field identification, it is not as immune to noise impulses, which simulate line-frequency pulses, as might be desired for some applications.

Previously mentioned application Serial No. 259,171 is directed to a field-recognition system which includes a disabling circuit in order to effect noise immunity in the system. The disabling circuit effectively causes the field-recognition system to be operative only during a short interval during each field of scan, this interval being in the vicinity of the field-frequency pulses. The field-recognition system is disabled for a short period after it has responded during one of these intervals and, thus, any noise pulses simulating line pulses and occurring this period are ineffective to operate the field-recognition system. However, though the system described in the copending application Serial No. 259,171 is, for all normal purposes, immune to noise pulses, since control pulses for the recognition system are derived from the field-scanning circuits of the receiver, the latter system is somewhat dependent upon the stability of operation of such field-scanning circuits and, specifically, on the phase of the vertical retrace pulse occurring during each field. In the presence of extreme noise conditions, which are capable of rendering the operation of the field-scanning circuits unstable, the latter field-identification system may also become unstable. Therefore, the present invention is directed to a field-identification system which is more noise immune than those described in applicant's copending applications previously referred to herein.

It is an object of the present invention, therefore, to provide, for a television system, a new and improved field-identification system which avoids the deficiencies of prior such systems.

It is another object of the present invention to provide, for a television system, a new and improved field-identification system which is relatively simple in construction and stable in operation.

It is an additional object of the present invention to provide a new and improved field-identification system for an odd-line interlaced television system for identifying the even-line fields with respect to the odd-line fields even when noise pulses in the television system render the operation of the field-scanning circuits unstable.

It is still another object of the present invention to provide a new and improved field-identification system, for use in an odd-line interlaced television system, which is capable of utilizing conventional television synchronizing pulses to effect the identification of the odd fields.

It is still a further object of the present invention to provide, for use in the type of color-television system described in the article previously mentioned, a new and improved field-identification system for developing a control effect to synchronize the phase sequence in which the receiver color-signal deriving means derives color signals with that phase sequence at which those color signals modulate a subcarrier wave signal at the transmitter.

In accordance with a particular form of the present invention, a field-identification system in an odd-line interlaced television system comprises a circuit for supplying a composite television signal including line-frequency pulses and groups of field-frequency pulses, said groups of field-frequency pulses having one time relation with respect to said line-frequency pulses during one group of fields and another time relation during interlaced fields. The field-identification system also comprises a generator for developing a signal desirably substantially in coincidence with each of the groups of field-frequency pulses and desirably having a peak amplitude at a time in the vicinity of a line-frequency pulse of one of the aforementioned fields, said developed signal tending to vary from these desirable relationships. Additionally, the field-identification system comprises a frequency-control circuit responsive jointly to the aforementioned developed signal and the field-frequency pulses for developing a resultant signal and for applying the resultant signal to the generator to maintain the desirable relationships. The field-identification system also comprises a circuit for supplying pulse signals substantially synchronously with the line-frequency pulses and comprises a control system jointly responsive to the last-mentioned pulse signals and the developed coincidence signal for developing a control effect representative of the time relationship of the line-frequency pulses and the groups of field-frequency pulses, thereby to identify each field.

For a better understanding of the present invention, together with other and further objects thereof, reference is had to the following description taken in connection with the accompanying drawings, and its scope will be pointed out in the appended claims.

Figure 1:
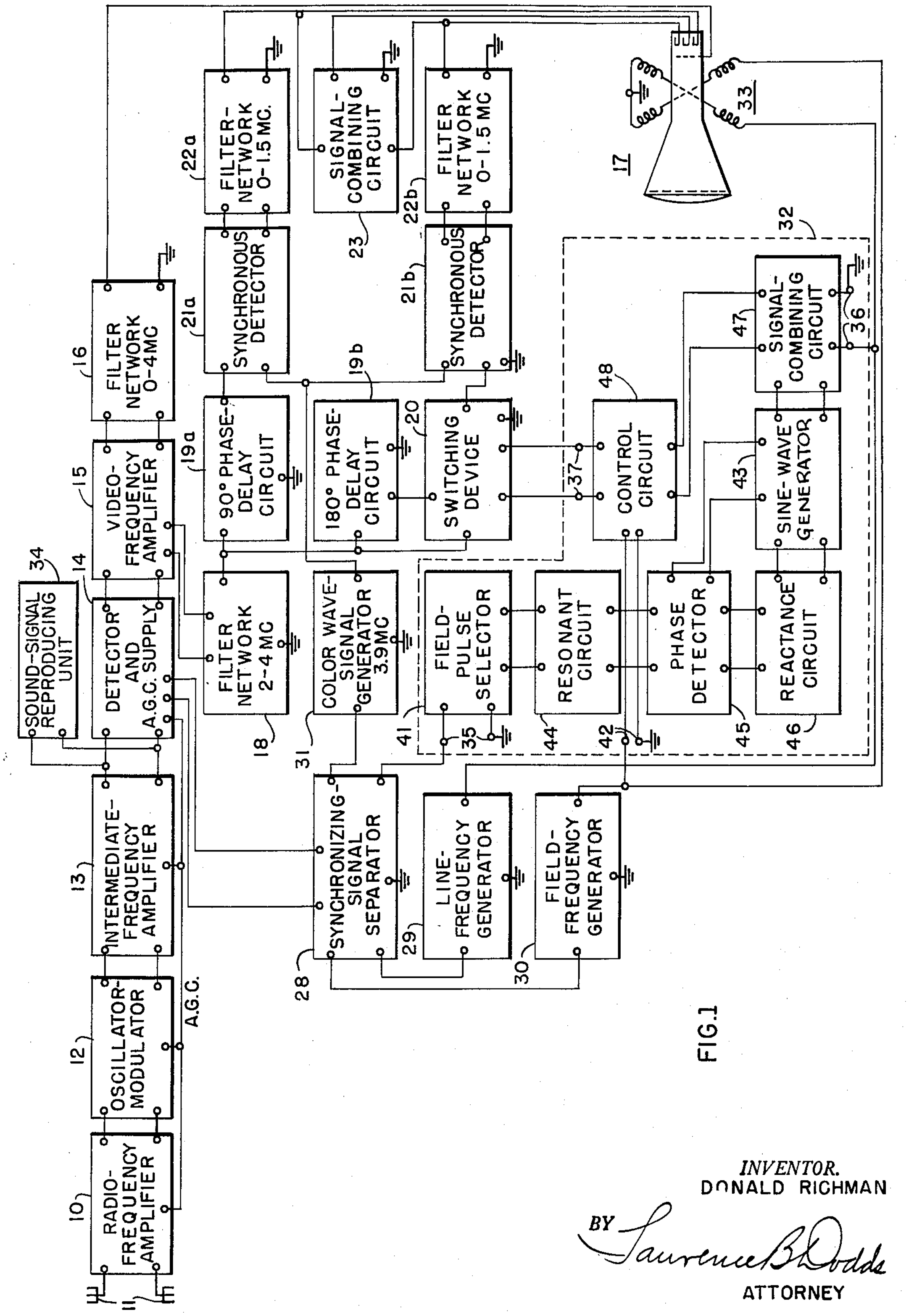
Fig. 1 is a schematic diagram representing a color-television receiver embodying a field-identification system in accordance with one form of the invention.

*General description of receiver of Fig. 1*

Referring now to Fig. 1 of the drawings, there is represented a color-television receiver of the type employed in an odd-line interlaced television system, and particularly of the type employed in the color-television system described in the previously mentioned article in Electronics. The receiver includes a radio-frequency amplifier 10 of one or more stages having an input circuit coupled to an antenna system 11, 11. Coupled in cascade with the output circuit of the amplifier 10, in the order named, are an oscillator-modulator 12, an intermediate-frequency amplifier 13 of one or more stages, a detector and automatic-gain-control (AGC) supply 14, a video-frequency amplifier 15 of one or more stages and a 0–4 megacycle filter network 16. The output circuit of the network 16 is coupled to an intensity control electrode of a cathode-ray tube in an image-reproducing device 17. This cathode-ray tube may, for example, comprise a single envelope having a plurality of cathodes individually responsive to the different color signals and having an arrangement for directing the beams emitted from the separate cathodes onto suitable different color phosphors. Such a tube is more fully described in an article entitled "General Description of Receivers for the Dot-Sequential Color-Television System Which Employ Direct-View Tri-Color Kinescopes," in the RCA Review for June 1950, at pages 228–232, inclusive. It will be understood that other suitable types of color-television image-reproducing devices may be employed.

Coupled in cascade with another output circuit of the amplifier 15, in the order mentioned, are a 2–4 megacycle filter network 18, a 90° phase-delay circuit **19*a*, a synchronous detector 21*a*, a 0–1.5 megacycle filter network 22*a*, and one of the cathodes of the cathode-ray tube in the device 17. The output circuit of the network 18 is also selectively coupled either through a 180° phase-delay circuit 19*b* and a switching device 20 or directly through the switching device 20 to a synchronous detector 21*b*, the coupling path being determined by the switching position of the device 20, as will be explained more fully hereinafter. The output circuit of the detector 21*b* is coupled through a 0–1.5 megacycle filter network 22*b* to another one of the cathodes of the cathode-ray tube in the device 17. Detectors of the type of units 21*a* and 21*b* are more fully described in the copending application Serial No. 244,756, previously referred to herein. The output circuits of the units 22*a* and 22*b* are also coupled to separate input circuits of a signal-combining circuit 23, the output circuit of which is coupled to the remaining one of the cathodes in the cathode-ray tube of the device 17. A signal-combining circuit of a suitable type is more fully described in the copending application Serial No. 259,171 and is effectively an arrangement for combining portions of the signals developed in the output circuits of the networks 22*a*, 22*b* to develop a third signal for application to a cathode of the cathode-ray tube in the device 17. A color wave-signal generator 31, which may be a conventional sine-wave oscillator for developing a signal having a frequency of approximately 3.9 megacycles, includes an output circuit coupled to an input circuit in each of the detectors 21*a* and 21*b*. The 90° and 180° phase-delay characteristics of the units 19*a* and 19*b*, respectively, are proportioned to delay a signal having a frequency the same as that of the signal developed in the generator 31** by the degrees mentioned.

An output circuit of the unit 14 is coupled through a synchronizing-signal separator 28 to line-scanning and field-scanning windings 33 in the device 17 through a line-frequency generator 29 and a field-frequency generator 30, respectively. An output circuit of the separator 28 is also connected to an input circuit of the generator 31 and another output circuit of the unit 28 is connected to a pair of terminals 35, 35 in a field-identification system 32 for a purpose which will be described more fully hereinafter. The generators 29 and 30 are additionally connected through a pair of terminals 36, 36 and a pair of terminals 42, 42, respectively, to input circuits of the identification unit 32 to be described subsequently.

The AGC supply circuit of the unit 14 is connected to the input circuits of one or more of the tubes of the radio-frequency amplifier 10, the oscillator-modulator 12 and the intermediate-frequency amplifier 13 in a well-known manner to maintain the signal input to the detector 14 within a relatively narrow range for a wide range of received signal intensities. A sound-signal reproducng unit 34 is also connected to the output circuit of the intermediate-frequency amplifier 13 and has the usual stages of intermediate-frequency amplification, a sound-signal detector, stages of audio-frequency amplification and a sound-reproducing device.

It will be understood that the various units thus far described and their circuit arrangement with the exception of the arrangement of the units of the field-identification system 32 may be of any conventional construction and design. The details of such units are well known in the art, thereby rendering a further description thereof unnecessary.

*General operation of receiver of Fig. 1*

In considering briefly the operation of the receiver of Fig. 1 as a whole, it will be assumed that the field-identification system 32 is a system for controlling the operation of the switching device 20 to effect either direct coupling of the output circuit of the unit 18 to the detector 21*b* or coupling to the detector 21*b* through the 180° phase-delay circuit 19*b*. A desired composite television wave signal including color information is intercepted by the antenna system 11, 11. The signal is selected and amplified in the radio-frequency amplifier 10 and applied to the oscillator-modulator 12 wherein it is converted to an intermediate-frequency signal. The latter sgnal is then selectively amplified in the unit 13 and supplied to the detector 14 wherein its modulation components are derived. These modulation components are translated through the amplifier 15 and include a 0–4 megacycle brightness component which is translated through the filter network 16 and applied to an intensity control electrode of the cathode-ray tube in the device 17. The modulation components derived in the unit 14 also include a 3.9 megacycle modulated subcarrier wave signal which is translated through the filter network 18, delayed in phase by 90° in the unit 19*a*, and applied to the synchronous detector 21*a*. This 3.9 megacycle wave signal is also selectively applied directly, that is, without appreciable phase delay, through the switching device 20 or through the units 19*b* and 20 with a phase delay of 180° to the synchronous detector 21*b*. The mode of operation of the units 19*b* and 20 will be described more fully hereinafter.

The synchronizing-signal components of the video-frequency signal are separated from the video-frequency components in the separator 28 and are used to synchronize the operation of the generators 29, 30, and 31. The line-frequency and field-frequency generators 29 and 30, respectively, supply signals of saw-tooth wave form which are properly synchronized with reference to the transmitted television signal and are applied to the deflection windings 33 thereby to effect a scanning of the target screen in the cathode-ray tube of the device 17 in a sequence of lines by deflecting the cathode-ray beam in this tube in two directions normal to each other. The synchronizing component applied to the generator 31 is conventionally designated as a color burst signal developed at the transmitter with a predetermined phase and a frequency of 3.9 megacycles and is used to synchronize the operation of the 3.9 megacycle generator 31 with a corresponding 3.9 megacycle generator at the transmitter. The synchronized sine-wave signal developed in the unit 31 is applied directly to input circuits in the detectors 21*a* and 21*b*. Briefly, the detector 21*a* is effective to derive the modulation components occurring at the 90° phase point of the modulated subcarrier wave signal, these components in the system under consideration being representative of the blue color of the image. The detector 21*b* is effective to derive the components representative of the red color of the image. By controlling the operation of the switching device 20 by means of the unit 32, the components representative of red and blue are derived from the subcarrier wave signal in the order mentioned during one field and in the order of blue, red during the field immediately following. This alternation is repeated for each frame. In other words, the switching of the unit 20 so controls the path of translation of the modulated subcarrier wave signal that it is applied to the detector 21*b* without appreciable phase delay during one field, and the components representative of red are derived during one field of scan from a point on the subcarrier wave signal 90° in phase ahead of the point at which the components representative of blue are derived, that is, the components representative of red may be said to be derived at the 0° phase point of the subcarrier wave signal while the components representative of blue are derived at 90°. By causing the subcarrier wave signal to be translated through the 180° phase-delay circuit 19*b*, the components representative of red are derived during the immediately following field from a point on the subcarrier wave signal lagging by 90° in phase that point at which the components representative of blue are derived, specifically, at the 180° phase point. Of course, such detection operation at the receiver presupposes that a similar modulation operation is being effected at the transmitter, as more fully described in the Electronics article previously referred to herein. Thus, the phase sequence in which the color-signal components are derived on alternate fields is changed in synchronism with the similar sequence change at the transmitter for the reasons previously considered herein. The switching device 20 is controlled to effect such change in the sequence of the derived signals by a control effect derived in the field-identification system 32 in a manner to be described more fully hereinafter.

The 0–1.5 megacycle portion of the blue color-signal components derived in unit 21*a* is translated through the unit 22*a* and applied to one of the cathodes in the cathode-ray tube in the device 17. Similarly, the 0–1.5 megacycle red components are translated through the unit 22*b* and are applied to another one of the cathodes in the cathode-ray tube of the device 17. Portions of the blue and red components are combined in the signal-combining device 23 to develop a signal representative of the green color of the image in a manner more fully described in the copending application Serial No. 259,171. The signal representative of the green component is then applied to the remaining cathode of the cathode-ray tube in the device 17. The color-signal components on the cathodes of the cathode-ray tube and the brightness signal on the control electrode thereof modulate the intensity of the electron beams emitted from the different cathodes in accordance with the amplitude variations of the applied signals, and the scanning action of the intensity modulated beams is effective to reproduce the color image being televised at the transmitter.

The automatic-gain-control or (AGC) signal derived in the unit 14 is effective to control the amplification of one or more of the units 10, 12 and 13 to maintain the signal input to the detector 14 and to the sound-signal reproducing unit 34 within a relatively narrow range for a wide range of received signal intensities. The sound-signal modulated wave signal having been selected by the unit 10, converted to an intermediate-frequency signal in the unit 12, and translated to the unit 13, is applied to the unit 34. Therein it is amplified and detected to derive the sound-signal modulation components which may be further amplified and therein reproduced in the reproducing device of the unit 34.

*Description of field-identification system of Fig. 1*

Referring now in particular to the field-identification system 32 of Fig. 1, this system comprises a circuit for supplying a composite television signal including line-frequency pulses and groups of field-frequency pulses, the groups of field-frequency pulses having one time relation with respect to the line-frequency pulses during one group of fields, and another time relation during interlaced fields. More specifically, the supply circuit includes the terminals 35, 35 and an input circuit of a field-pulse selector 41 coupled thereto for supplying such a composite signal from, for example, the synchronizing-signal separator 28. As previously described herein, the terminals 35, 35 are connected to an output circuit of the separator 28.

The field-identification system also includes a generator, specifically, a sine-wave oscillator 43 for developing a signal desirably substantially in coincidence with each of the groups of field-frequency pulses and desirably having a peak amplitude at a time in the vicinity of the line-frequency pulses during one of the aforementioned fields. For purposes of stability and facility in controlling the frequency thereof, the oscillator 43 is designed to operate at a high frequency, for example, a frequency of 7,860 cycles, this frequency representing ½ the line frequency less 15 cycles. A brief consideration of the relative occurrences in time of the line-frequency pulses and the field-frequency pulses will indicate that, in order that the developed sine-wave signal occur substantially in phase with a reference phase of each of the groups of field-frequency pulses and have a peak amplitude at a time in the vicinity of the line-frequency pulses during only one of the groups of fields, a signal which has a frequency of 7,860 cycles or an even harmonic or subharmonic thereof is desirable. As explained more fully in the copending application Serial No. 244,756, on, for example, even-line fields some of the line-frequency pulses occur in coincidence with the peaks of the developed signal while, for example, on the odd-line fields, none of the line-frequency pulses occurs in coincidence with the peaks but some of them occur in coincidence with the axis cross-over points of the developed signal. Thus from one field to the next, the line-frequency pulses shift by ¼ of a cycle of the developed signal while the developed signal remains in proper phase with the groups of field-frequency pulses. Since this represents a shift of one cycle in four fields it represents a difference of 15 cycles in frequency, in other words, one-quarter of the field frequency between the developed signal and one-half line frequency.

Though the oscillator 43 is designed to operate at the above-mentioned frequency due to parameter changes and unpredictable signal effects, the signal developed in the generator 43 tends to vary from the above-expressed desired relationships with respect to the field-frequency pulses and line-frequency pulses.

To compensate for the tendency of the generator 43 to vary in frequency, the field-identification system also includes a frequency-control circuit responsive jointly to the signal developed in the generator 43 and the field-frequency pulses selected in the unit 41 for developing a resultant signal and for applying said resultant signal to the generator 43 to maintain the above-mentioned desirable relationships. Specifically, the frequency-control circuit comprises, in cascade, between an output circuit of the selector 41 and an input circuit of the oscillator 43 a resonant circuit 44, a phase detector 45, and a reactance circuit 46. An output circuit of the oscillator 43 is also coupled to an input circuit of the phase detector 45. The resonant circuit 44 is a tuned circuit having a resonant frequency corresponding approximately to ½ the frequency of the line-frequency pulses, for example, having a frequency of 7,860 cycles for excitation by the signals selected in the unit 41 to develop an output signal for application to the detector 45. A more complete description of the units 41, 44 and of a unit 47, to be considered shortly, is presented in applicant's copending application Serial No. 244,756, previously mentioned herein. As described in the application just referred to with reference to Figs. 2 and 3 thereof, the unit 44 may be a conventional tuned circuit including inductance and capacitance, and the unit 41 may comprise conventional integration and differentiating circuits for selecting a signal representative of field pulses in preference to line pulses. In some circuits the unit 41 may be a portion of the synchronizing-signal separator and be responsive both to line-frequency and field-frequency pulses as is the separator. The resonant circuit in such a combination has circuit elements so proportioned as to develop signals of greater amplitude from the concentrated energy of the field-frequency pulses than from the dispersed energy of the line-frequency pulses.

The field-identification system also comprises a circuit for supplying pulse signals substantially synchronously with the line-frequency pulses. The latter circuit comprises an input circuit of the signal-combining circuit 47 coupled to the terminals 36, 36 which, as previously described, are coupled to an output circuit of the line-frequency generator 29. As described in the application last referred to herein, the signal-combining circuit may comprise a multi-winding transformer having one winding coupled to the oscillator 43, another winding coupled to the terminals 36, 36 and an output winding coupled to a control circuit 48.

The field-identification system additionally comprises a control system jointly responsive to the pulse signal applied through the terminals 36, 36 and the developed coincidence signal for developing a control effect representative of the time relation of the line-frequency pulses and the groups of field-frequency pulses. This control system includes the signal-combining circuit 47 jointly responsive to the developed pulse signals applied to the terminals 36, 36, these signals being representative of the line-frequency pulses, and to the developed coincidence signal applied from the oscillator 43 for combining these signals to develop resultant signals. The control system also includes a control circuit 48 coupled between the output circuit of the unit 47 and, through terminals 37, 37, to the input circuit of the switching device 20. One form of such a control circuit is described with reference to Fig. 2 of the copending application Serial No. 259,171, previously referred to herein, and another form thereof, will be described herein with reference to Fig. 3. Such control circuit may be a conventional peak detector responsive to the sum of the intensities of the signals combined in the unit 47. Essentially, the control circuit 48 is an arrangement for developing from the signal developed in the unit 47 a square wave or similar signal having a repetition frequency of 30 cycles and phased with the occurrence of the odd-line and even-line fields thereby to cause the switching device 20 to be in the proper switch position for the odd-line and even-line fields. An input circuit of the unit 48 is also coupled through a pair of terminals 42, 42 to the output circuit of the field-frequency generator 30.

*Explanation of operation of field-identification system of Fig. 1*

The operation of a field-identification system analogous to that of Fig. 1 has been fully described in the copending applications Serial Nos. 244,756 and 259,171. Such explanations did not include the operation of the units 43, 45, and 46 and will be considered briefly at this time without consideration of the last-mentioned units. A composite television synchronizing signal including both field-frequency and line-frequency pulses is applied from the unit 28 through the terminals 35, 35 to the field-pulse selector 41. In accordance with the Federal Communication Commission's Standards for Commercial Television Broadcasting, the applied field-frequency pulses have one time relation with respect to the applied line-frequency pulses during one group of fields and another time relation during interlaced fields. This relationship is maintained in order that the odd-line interlaced system may be utilized, that is, that during one field the initial line of the field will start in the upper left-hand corner of the raster being traced, while on the next field, the initial line of that field will start in the upper portion of the field interlaced between the previously traced lines and at a portion half-way between the sides of the raster. The field-pulse selector 41, for example, by means of conventional integration and differentiation effectively separates a signal representative of each group of field-frequency pulses from the line-frequency pulses and applies this selected signal to the resonant circuit 44.

The circuit 44 resonates at its resonant frequency, for example, at 7,860 cycles, this frequency being approximately ½ the frequency of the line-frequency pulses. The signal developed in the circuit 44 is substantially in coincidence with the field-frequency pulse signal which excites the resonant circuit, that is, a phase of the developed signal has a predetermined relation with respect to a reference phase of the exciting field-frequency pulses. Additionally, the developed signal has a peak amplitude approximately in coincidence with a line-frequency pulse in one of the fields. As considered previously, because of the relationship of the line-frequency pulses to the field-frequency pulses during the fields interlaced with the aforesaid one field, this peak amplitude is not in coincidence with a line-frequency pulse during the interlaced fields, such pulse occurring substantially at the points where the developed signal crosses the axis thereof.

If now the units 43, 45, and 46 are considered solely as units for translating the signal developed in the circuit 44 to an input circuit of the unit 47, the signal developed in the resonant circuit 44 is applied to the signal-combining circuit 47 wherein it combines with the line-frequency pulses conventionally developed in an output circuit of the generator 29 during line retrace intervals and which are applied through the terminals 36, 36 thereby to develop a resultant signal in the output circuit of the unit 47. For example, as described in the copending applications, the unit 47 may be a transformer to the primary of which the signals from the units 44 and 29 are applied and the secondary of which is coupled to the unit 48. During one group of fields the resultant signal developed in the unit 47 will have the line-frequency pulses or at least some thereof superimposed on the peaks thereof, while during another group of fields interlaced with the first group, there will be no line-frequency pulses superimposed on the peaks of the signal developed in the resonant circuit 44, such pulses occurring along the axis of the resonant signal at cross-over points of the latter signal.

The resultant signal developed in the unit 47 is applied to the control circuit 48 wherein an operation such as peak detection develops a control effect during the initial portion of the one field in which a line pulse is superimposed on the resonant signal. However, no control effect is developed during the interlaced fields. As explained in the copending applications, in order to minimize the operation of the control circuit 48 in response to noise pulses, this circuit may be gated by a pulse derived from the field-retrace pulses conventionally developed in the output circuit of the generator 30. The derived pulse is translated through the terminals 42, 42 and gates the unit 48 on during a period at least coextensive with the field-frequency pulses.

The control effect developed in the output circuit of the unit 48, and which may be in the form of a triggering pulse or in the form of a 30-cycle square wave the phasing of which is determined by the coincidence or lack of coincidence of the line-frequency pulses with the peak of the resonant signal, is applied through the terminals 37, 37 to the switching device 20 to determine the switch position thereof. The proper positioning of the switch in the device 20 assures that the signals derived in the detectors 21*a* and 21*b* are derived in phase sequences which coincide with the phase sequences being employed in the color-signal modulator at the transmitter. In other words, during one group of fields, for example, the even-line fields, the signals derived in the detector 21*a* will be derived from a phase point preceding the phase point at which the signals are derived in the detector 21*b*. During the interlaced fields, that is, the odd-line fields, the signals derived in the detector 21*a* will be derived from a phase point occurring after the phase point at which the signals derived in the detector 21*b* are derived.

The field-identification system just considered in which the precise operation of the units 43, 44, and 45 has been neglected and which is the subject matter of application Serial No. 244,756, previously referred to herein, is generally satisfactory in identifying the one group of fields with respect to the other group thereof and thus in maintaining the color signal-deriving apparatus at the receiver in proper synchronism with the color signal-modulation apparatus at the transmitter. However, such a simple system is not as immune to noise impulses which disturb the line-frequency and field-frequency pulses as might be desired for some applications. Consequently, it is desired to improve the immunity of such system and such improvement in immunity is obtained by utilizing the units 43, 45, and 46 effectively to average out the effects of noise impulses.

The sine-wave oscillator 43, as previously discussed herein, is of a conventional type for developing a signal having a frequency approximately equal to ½ line frequency, for example, a signal having a frequency of 7,860 cycles. The signal developed in that oscillator is substantially immune to noise effects occurring external to the oscillator, but, in order to be useful in identifying the different groups of fields, such signal should be related in phase to the signal developed in the resonant circuit 44. In other words, the signal developed in the oscillator 43 should substantially coincide in phase with the signal developed in the resonant circuit 44. This coincidence in phase is effected by utilizing a phase detector 45 of a conventional type in which any phase difference between the signals developed in the unit 44 and in the unit 43 is detected and utilized to control a reactance circuit 46 of a conventional type which, in turn, controls the phasing of the signal developed in the oscillator 43 so as to eliminate such phase difference. The phase detector 45 effectively integrates the signals detected therein over a period of time, for example, for a period substantially equal to the duration of a field, in other words, for approximately 1/60 of a second. The period of integration may be longer and may cover several fields. The manner in which units such as the units 43–46, inclusive, minimize the effects of random noise is well known and need not be considered in detail herein.

The utilization of a local oscillator of proper frequency in place of a signal developed in the resonant circuit has advantages over the simple system employing only the resonant circuit. For example, by employing such local oscillator circuit the control signal is not dependent on such pulses as the field-frequency synchronizing pulses being present continuously or being correctly phased during each cycle. In other words, the signal for controlling the switching device 20 may be stable and usable when individual ones of the line-frequency and field-frequency pulses may be unstable and practically unusable and when random noise of a normally disturbing magnitude is present in the television system.

Figure 2:
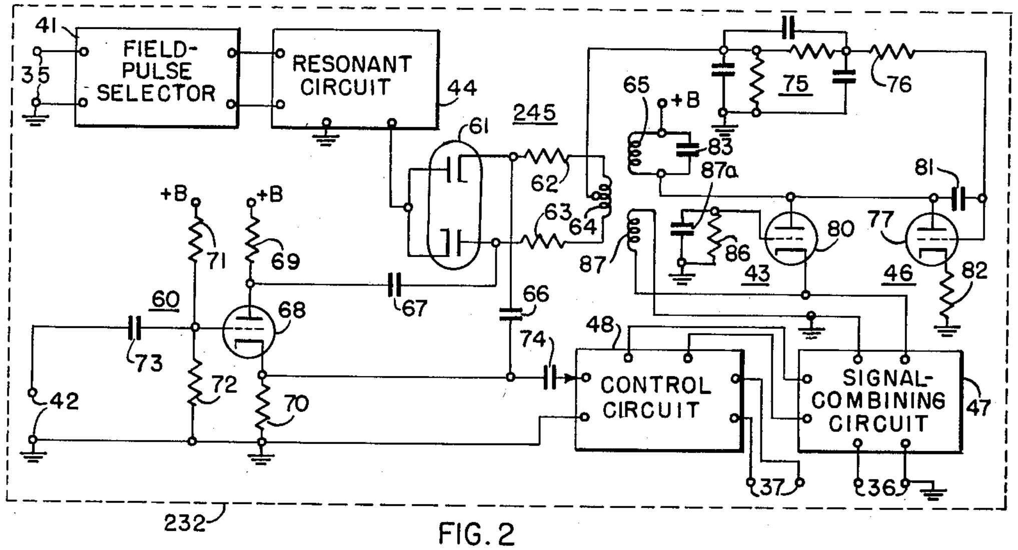
Figs. 2 and 3 are circuit diagrams partially schematic including modified forms of portions of the field-identification system of Fig. 1.

*Description of field-identification system of Fig. 2*

It may be desired further to improve the immunity of the field-identification system by causing this system to develop a control signal in the phase detector 45 for controlling the phasing of the signal developed in the oscillator 43 only during that portion of each field in which the resonant circuit 44 is excited, in other words, only during approximately the portion of the field-retrace pulses. The field-identification system of Fig. 2 includes an arrangement for effecting such a result. Since the identification systems of Fig. 1 and Fig. 2 are related, corresponding units thereof are designated by the same reference numerals and analogous units are designated by the same reference numerals with a prefix of 2.

The system of Fig. 2 includes the phase detector 245 comprising a duo-diode tube 61 having the anode circuit of one diode and the cathode circuit of the other connected together and to the output circuit of the resonant circuit 44. The remaining cathode and anode circuits are connected together through the series circuit of resistors 62, 63 and the center-tapped inductor 64, the latter being inductively coupled to an inductor 65 which is a portion of the frequency-determining circuit of the oscillator 43. The last-mentioned cathode and anode circuits of the tube 61 are also coupled, respectively, through isolating condensers 66 and 67, respectively, to the cathode and anode circuits of a triode 68 which is part of an isolating amplifier 60. The anode of the tube 68 is connected through a load resistor 69 to one terminal of a source of potential +B while the cathode is connected through a load resistor 70 to the other terminal thereof. Additionally, a pair of series-connected resistors 71, 72 are coupled across the source of potential +B to form a voltage-divider network, the junction of these resistors being connected to the control electrode of the tube 68, while the terminals 42, 42 are connected across the resistor 72 through a coupling condenser 73. The cathode load circuit of the tube 68 is also coupled to an input circuit of the control circuit 48 through a coupling condenser 74.

An integration circuit 75 having a time constant of at least $1/60$ of a second is coupled between the center tap of the inductor 64 through a resistor 76 to the control electrode of a tube 77 in the reactance circuit 46. The integration circuit 75 is of a conventional type including resistor and condenser elements and need not be described in detail herein. The anode of the tube 77 is coupled to the anode of a triode 80 in the oscillator 43 and through a condenser 81 to the control electrode of the tube 77. The cathode of the tube 77 is coupled to the low-potential terminal of the potential source +B through a resistor 82. The reactance circuit 46 is of a conventional type, effectively being a variable impedance across the tuned circuit including the inductor 65 and the condenser 83, the proportionings of the condenser 81 and the resistor 82 and the type of tube 77 being in accordance with well-known principles. The oscillator 43, including the tube 80, is a modified type of Hartley oscillator having an anode frequency-determining parallel-resonant circuit including the inductor 65 and the condenser 83 coupled between the anode of the tube 80 and the positive terminal of the B potential source. The control electrode of the tube 80 is coupled through a biasing circuit of a resistor 86 and a condenser 87*a* in parallel to the negative terminal of the potential source +B while the cathode is coupled through an inductor 87 to the latter terminal of the potential source +B. The inductor 87 is inductively coupled to the inductor 65 and also coupled to the input circuit of the signal-combining circuit 47.

*Explanation of field-identification system of Fig. 2*

The field-identification system of Fig. 2 operates in a manner similar to that of the unit 45 of Fig. 1 except for the operation of the isolation amplifier 60 to provide keying signals to the phase detector 245 and to the control circuit 48. As explained with reference to the system 45 of Fig. 1, the phase detector would continuously develop control signals for application to the reactance circuit 46 to control the phase of the signal developed in the oscillator 43. During the intervals between excitation of the resonant circuit 44 by the group of field-frequency pulses such continuous operation of the phase detector may be detrimental in that it may respond to noise effects that excite the resonant circuit 44 and develop an erroneous control signal for application to the reactance circuit 46. Therefore, it may be desirable to permit the phase detector 245 to operate only for intervals approximately coinciding with the groups of field-frequency pulses. To effect this result, the phase detector 245 is normally so biased as not to be responsive to signals applied to the electrodes of the tube 61. Shortly after the initiation of each group of field-frequency pulses, a conventional field-retrace pulse is developed in the television receiver and as described in the copending application Serial No. 259,171 is effective to develop a gating pulse at least coextensive with each field-frequency pulse and preferably having a duration greater than that of each field-frequency pulse. This gating pulse is applied through the terminals 42, 42 to the control circuit of the isolation amplifier 60. A gating pulse having one phase is developed in the anode circuit of the tube 68 and one having an opposite phase is developed in the cathode circuit of the same tube. Different ones of these pulses are applied to a cathode and an anode of the tube 61 in the phase-detector circuit 245 to condition the tube 61 to respond to the signals applied to the electrodes thereof from the resonant circuit 44 and through the coupling of the inductors 64 and 65 from the oscillator 43. Thus, during the time of the occurrence of the gating pulses, the phase detector 245 compares the phase of the signal being developed in the oscillator 43 with that of the signal present in the resonant circuit 44 and develops in the integration circuit 75 a potential representative of any misphasing of the last-mentioned signals. The latter potential, if any misphasing is present, is effective to control the reactance circuit 46 to alter the phasing of the signals being developed in the oscillator 43 to cancel any such phase differences. It is thus apparent that the phasing of the signals developed in the oscillator 43 is controlled only during such times as signals are properly developed in the resonant circuit 44 by excitation of this circuit by the groups of field-frequency pulses. The phasing of the signals developed in the oscillator 43 is therefore immune to any effects that may be developed in the resonant circuit 44 at times other than during the intervals of the field-retrace pulses. In this way, greater noise immunity is obtained in the field-identification system 232 of Fig. 2.

Figure 3:
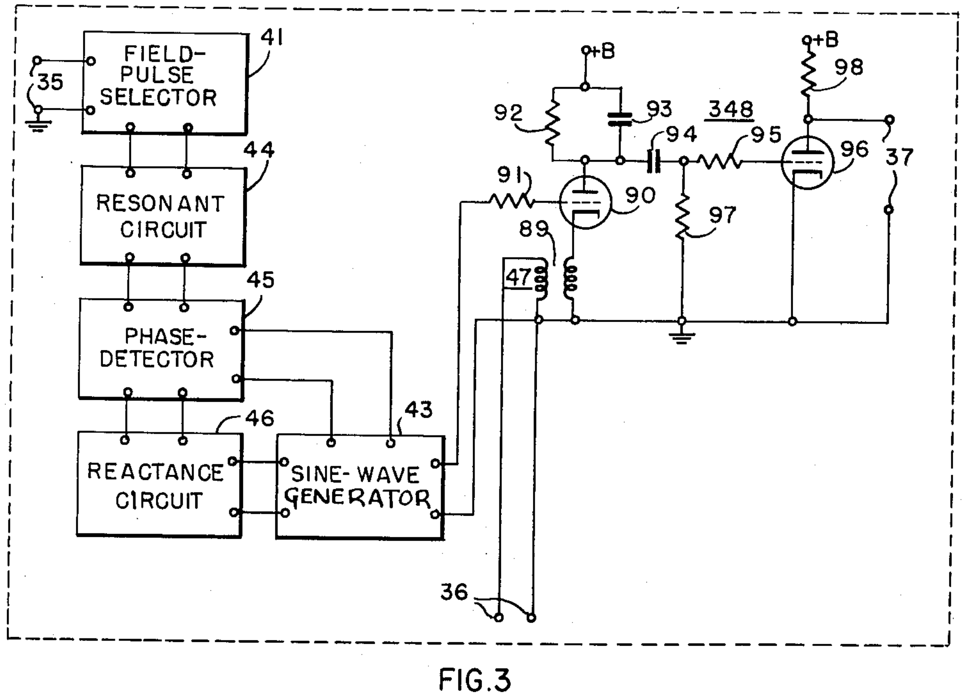

*Description of field-identification system of Fig. 3*

As has been stated previously, the improved field-identification system, as described herein, has increased stability of operation in the presence of noise. In view of this increased stability, some economy of components may be obtained by simplifying the control system portion of the identification system. One example of such a simplified control system is represented as a portion of Fig. 3. Since the identification system of Fig. 3, except for the details of the control system, is generally similar to that of Fig. 1, corresponding units thereof are identified by the same reference numbers and analogous units by the same reference numbers with a prefix of 3.

In the identification system of Fig. 3 the signal-combining circuit 47 includes a transformer 89, the primary winding of which is connected to the terminals 36, 36, and the secondary winding of which is connected between the negative terminal of a potential source +B and the cathode of a triode 90. The triode 90 is part of a peak-detecting circuit and includes a control electrode circuit coupled through a resistor 91 to the output circuit of the sine-wave oscillator 43. As a result of the circuit parameters and the peak-detection action thereof, the tube 90 is normally nonconductive except when a negative-going signal is applied to the cathode thereof and a positive-going signal is applied to the control electrode thereof. In other words, the tube has the conventional peak-detection characteristic of developing an output signal representative of the combined peak effect of the applied input signals. The anode circuit of the triode 90 comprises a resistor 92 and a condenser 93 in parallel and connected between the anode of the tube 90 and the positive terminal of the B potential source. The resistor 92 and the condenser 93 have a time constant at least of the order of 1/30 of a second. The anode of the tube 90 is also coupled through a condenser 94 and a resistor 95 to the control electrode of a tube such as a triode 96, the junction of the condenser 94 and the resistor 95 being connected to the negative terminal of the B potential source through a resistor 97. The circuit including the condenser 94 and the resistors 95 and 97 has a relatively long time constant preferably greater than one-thirtieth of a second, and is arranged to translate a 30-cycle component of the signal developed in the anode circuit of the triode 90. Additionally, the anode load circuit of the triode 90 and the coupling circuit including the condenser 94 and the resistors 95 and 97 are so proportioned as to effect substantially a 90° phase shift between the phase of the signal applied to the control electrode circuit of the tube 90 and that applied to the control electrode circuit of the tube 96.

The circuit including the tube 96 is proportioned to effect symmetrical or double limiting and has sharp cut-off characteristics for both positive-going and negative-going signals applied thereto. This circuit effectively comprises a square wave generator, such a wave being developed by such double limiting. The cathode of the tube 96 is directly coupled while the anode thereof is connected through an anode load resistor 98, respectively, to the negative and positive terminals of the B potential source. The output terminals 37, 37 are connected across the anode-cathode of the tube 96.

*Explanation of operation of the field-identification system of Fig. 3*

The units 41 and 43–46, inclusive, in the system of Fig. 3, operate in the same manner as the corresponding units in the system of Fig. 1 to develop a properly phased and synchronized sine wave in the output circuit of the oscillator 43. This sine wave is applied through the resistor 91 to the control electrode circuit of the tube 90. Positive-going pulses synchronized with the line-frequency pulses are applied through the terminals 36, 36 and translated through the transformer 89 to the cathode circuit of the tube 90 to develop negative-going pulses therein. The signals applied to the control electrode and cathode circuits of the tube 90 are peak detected to develop in the anode circuit thereof a unidirectional signal effectively having a 30-cycle component. The manner of development of the latter signal may be more easily understood by considering the curves of Fig. 4*a*.

Figure 4A:
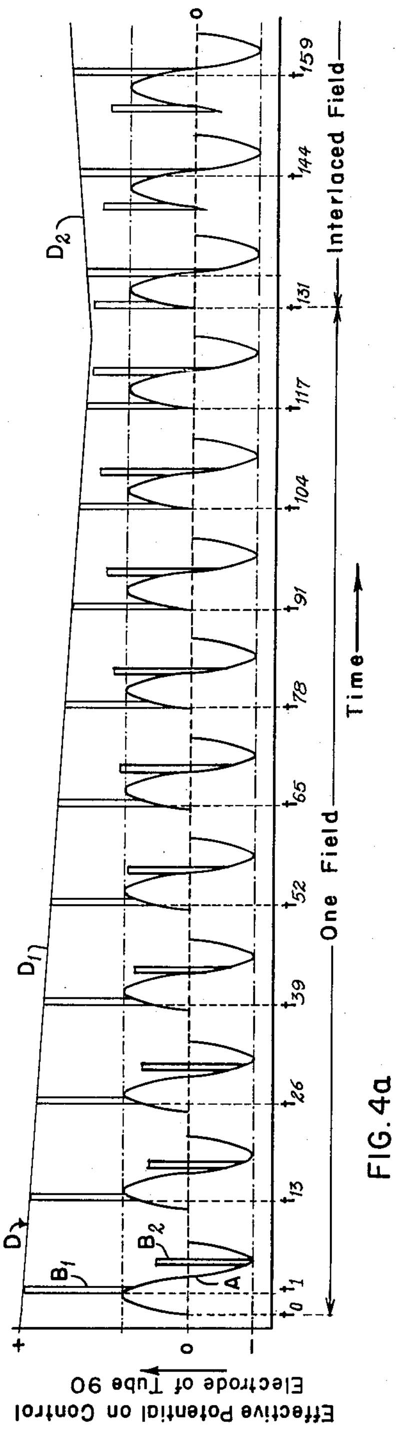
Figs. 4*a* and 4*b* are graphs utilized in explaining the operation of the modification of Fig. 3.

The curves of Fig. 4*a* represent the potentials developed in the control electrode and cathode circuit of the tube 90 during one field of scan and a portion of an interlaced field. For simplicity in presentation, these potentials are represented as the effective potential developed on the control electrode of the tube 90. Additionally, in order to represent the manner in which the signal is developed in the anode circuit of the tube 90 and to permit the use of a suitable time scale, the sine-wave signal developed by the oscillator 43 and applied to the control electrode of the tube 90 is not represented as a continuous signal, but rather different cycles of this signal are represented separated on an axis shown in broken-line construction to indicate arbitrarily every thirteenth cycle thereof. The pulses related to the line-frequency pulses occurring during these cycles are also represented. Thus, the first cycle of the sine wave is represented by Curve A having a duration including time $t_1$. Pulses $B_1$ and $B_2$ are also represented as occurring during the duration of their first cycle of the sine wave. Though not so marked, the other cycles represented may be considered to be similarly designated. As previously mentioned, the sine wave represented by curve A has a frequency of 7860 cycles per second. The pulses $B_1$ and $B_2$ represent line-frequency pulses and, thus, together have a repetition rate of 15.750 per second. However, to simplify the explanation of the development in the anode circuit of the tube 90 of the unidirectional signal having the 30-cycle component, the pulses $B_1$ may be considered to have a repetition rate of 7875 cycles while the pulses $B_2$ also have a repetition rate of 7875 cycles displaced in phase by 180° with respect to the pulses $B_1$.

As explained previously herein, and in the aforesaid copending applications, from the time of initiation of one field to the time of initiation of the second field, a line-frequency pulse, such as the signal represented by $B_1$, shifts from a point of coincidence with the peak of the sine wave represented by curve A at time $t_1$ to a point on the cross-over axis of the cycle of the sine wave represented by curve A at time $t_{131}$, this being the 131st cycle of the sine wave with reference to the cycle at $t_1$. This shift occurs as a result of the difference in frequency between the sine wave represented by curve A, having a frequency of 7860 cycles, and the one-half line frequency of 7875 cycles of the pulses $B_1$. As previously explained, this shift in phasing of the pulses $B_1$ and the sine wave represented by curve A is effective to distinguish, for example, the even-line field initiated at time $t_0$ from the odd-line field initiated at time $t_{131}$. In the even-line field a line-frequency pulse, such as $B_1$ at time $t_1$, coincides with the peak of the cycle of the sine wave at time $t_1$ while in the odd-line field the line-frequency pulses such as $B_1$ and $B_2$ occur in phase with the cross-over point of the cycle of the sine wave represented by curve A at time $t_{131}$. Due to this continuous shifting in the phase of the pulses $B_1$ and $B_2$ with respect to the sine wave represented by curve A and developed in the oscillator 43, the signal developed in the anode circuit of the peak detector circuit including the tube 90 varies from a peak potential at time $t_1$ to a minimum potential at approximately time $t_{131}$ or the termination of one field. This change in potential in the anode circuit of the tube 90 during the one field is represented by the portion $D_1$ of curve D and during the interleaved field by the portion $D_2$ of curve D. It is apparent that the portion $D_1$ decreases from a maximum at time $t_1$ to a minimum in the vicinity of time $t_{131}$ in the period of one field or, in other words, in 1/60 of a second. Similarly, though not completely represented, the portion $D_2$ increases from a minimum at time $t_{131}$ to a maximum at the end of the interlaced field and in a time of 1/60 of a second. The continuous development of the signal represented by curve D over many fields is represented in Fig. 4*b*.

Figure 4B:
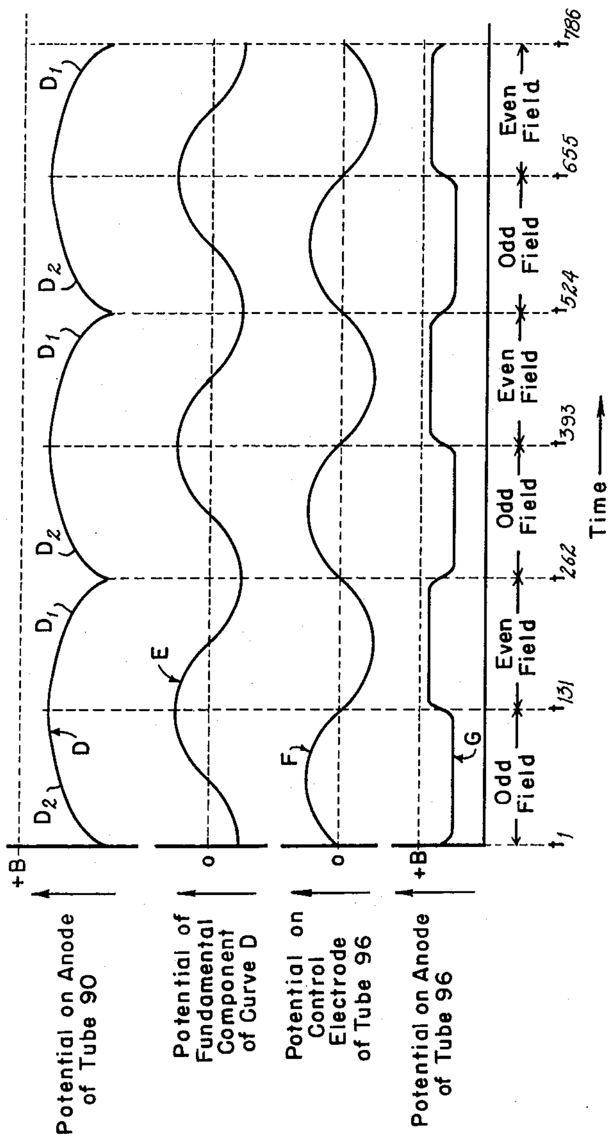

Referring to the curves of Fig. 4*b*, the portions $D_2$ of curve D are developed during the odd-line fields while the portions $D_1$ of curve D are developed during the even-line fields. Due to the time-constant of at least 1/30 of a second of the anode load circuit of the tube 90, curve D has a form such as represented in Fig. 4*b*. An examination of curve D indicates that a complete cycle thereof is developed in two fields or, in other words, in 1/30 of a second. Therefore, the signal represented by curve D has a 30-cycle component. This component is translated through the condenser 94 and applied to the control electrode of the tube 96 and, if no phase shift of the component occurred, would have the form represented by curve E of Fig. 4*b*. As explained previously, there is a 90° phase shift in the 30-cycle component, and thus, the signal applied to the control electrode of the double limiting circuit including the tube 96 has a form represented by curve F. It should be noticed that by effecting the 90° phase shift the axis cross-over times of the signal represented by curve F occur in phase with the coincidence of the peak of the sine wave developed in the sine-wave oscillator 43 and the pulse representative of the line-frequency pulses. Thus, when the limiter, including the tube 96, limits the positive-going and negative-going portions of the signal represented by curve F, and in a conventional manner inverts such portions in phase in the output circuit of the tube 96, a signal as represented by curve G is developed across the terminals 37, 37. It is apparent that the negative portions of the square-wave signal represented by curve G coincide with the odd fields while the positive-going portions coincide with the even fields. Thus, the signal represented by curve G is effective to control a switch such as the switching device 20 of Fig. 1 to cause the color signal-derivation apparatus of the receiver to function properly and in synchronism with the modulating apparatus at the transmitter.

The control system of Fig. 3 comprises a peak-detecting circuit and a symmetrical or double limiting circuit having conventional elements to develop from the sine wave generated in the oscillator 43 and the line-frequency pulses applied through the terminals 36, 36 a square-wave signal, the negative portions of which represent one type of field, and the positive portions of which represent another type of field. Thus, a simple control system of the type described may be utilized to control the operation of a switching device such as the unit 20 of Fig. 1.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal having a frequency of substantially 7860 cycles and desirably substantially in coincidence with each of said groups of field-frequency pulses and desirably having a peak amplitude at a time in the vicinity of a line-frequency pulse of one of said fields, said generated signal tending to vary from these desirable relationships; means including a resonant circuit coupled to said supply means and tuned to a high harmonic of field frequency and excited by said field-frequency pulses for developing a signal in coincidence with each of said groups of field-frequency pulses and having a peak amplitude at a time in the vicinity of said line-frequency pulse of said one of said fields; means including a phase detector responsive jointly to said generated and said developed signals for developing a resultant signal; means including a reactance circuit responsive to said resultant signal and coupled to said generator for applying said resultant signal to said generator to maintain said desirable relationships; means for supplying pulse signals substantially synchronously with said line-frequency pulses; and means including a control system jointly reponsive to said last-mentioned pulse signals and said generated signal for developing a control effect representative of the time relation of said line-frequency pulses and said groups of field-frequency pulses, thereby to identify each field.

2. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal desirably substantially in coincidence with each of said groups of field-frequency pulses and desirably having a peak amplitude at a time in the vicinity of a line-frequency pulse of one of said fields, said generated signal tending to vary from these desirable relationships; means including a frequency-control circuit responsive jointly to said generated signal and said field-frequency pulses for developing a resultant signal and for applying said resultant signal to said generator to maintain said desirable relationships; means for supplying pulse signals substantially synchronously with said line-frequency pulses; and means including a control system jointly responsive to said last-mentioned pulse signals and said generated signal for developing a control effect representative of the time relation of said line-frequency pulses and said groups of field-frequency pulses, thereby to identify each field.

3. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a sine-wave signal generator for generating a sine-wave signal desirably having a phase substantially in coincidence with a reference phase of each of said groups of field-frequency pulses and desirably having a peak amplitude at a time in the vicinity of a line-frequency pulse of one of said fields, said generated signal tending to vary from these desirable relationships; means including a frequency-control circuit responsive jointly to said generated signal and said field-frequency pulses for developing a resultant signal and for applying said resultant signal to said generator to maintain said desirable relationships; means for supplying pulse signals substantially synchronously with said line-frequency pulses; and means including a control system jointly responsive to said last-mentioned pulse signals and said generated signal for developing a control effect representative of the time relation of said line-frequency pulses and said groups of field-frequency pulses, thereby to identify each field.

4. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal having a frequency of approximately one half the frequency of said line-frequency pulses and desirably having a phase substantially in coincidence with a reference phase of each of said groups of field-frequency pulses and desirably having a peak amplitude at a time in the vicinity of a line-frequency pulse of one of said fields, said generated signal tending to vary from these desirable relationships; means including a frequency-control circuit responsive jointly to said generated signal and said field-frequency pulses for developing a resultant signal and for applying said resultant signal to said generator to maintain said desirable relationships; means for supplying pulse signals substantially synchronously with said line-frequency pulses; and means including a control system jointly responsive to said last-mentioned pulse signals and said generated signal for developing a control effect representative of the time relation of said line-frequency pulses and said groups of field-frequency pulses, thereby to identify each field.

5. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal having a frequency of substantially 7860 cycles and desirably having a phase substantially in coincidence with a reference phase of each of said groups of field-frequency pulses and desirably having a peak amplitude at a time in the vicinity of a line-frequency pulse of one of said fields, said generated signal tending to vary from these desirable relationships; means including a frequency-control circuit responsive jointly to said generated signal and said field-frequency pulses for developing a resultant signal and for applying said resultant signal to said generator to maintain said desirable relationships; means for supplying pulse signals substantially synchronously with said line-frequency pulses; and means including a control system jointly responsive to said last-mentioned pulse signals and said generated signal for developing a control effect representative of the time relation of said line-frequency pulses and said groups of field-frequency pulses, thereby to identify each field.

6. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal desirably substantially in coincidence with each of said groups of field-frequency pulses and desirably having a peak amplitude at a time in the vicinity of a line-frequency pulse of one of said fields, said generated signal tending to vary from these desirable relationship; means including a frequency-control circuit including a phase detector effectively responsive jointly to said generated signal and said field-frequency pulses for developing a resultant signal and including apparatus coupled jointly to said generator and said detector for applying said resultant signal to said generator maintain said desirable relationships; means for supplying pulse signals substantially synchronously with said line-frequency pulses; and means including a control system jointly responsive to said last-mentioned pulse signals and said generated signal for developing a control effect representative of the time relation of said line-frequency pulses and said groups of field-frequency pulses, thereby to identify each field.

7. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal desirably substantially in coincidence with each of said groups of field-frequency pulses and desirably having a peak amplitude at a time in the vicinity of a line-frequency pulse of one of said fields, said generated signal tending to vary from these desirable relationships; means including a frequency-control circuit including a phase detector effectively responsive jointly to said generated signal and said field-frequency pulses for developing a resultant signal and a reactance circuit coupled jointly to said generator and said detector for applying said resultant signal to said generator to maintain said desirable relationships; means for supplying pulse signals substantially synchronously with said line-frequency pulses; and means including a control system jointly responsive to said last-mentioned pulse signals and said generated signal for developing a control effect representative of the time relation of said line-frequency pulses and said groups of field-frequency pulses, thereby to identify each field.

8. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal desirably substantially in coincidence with each of said groups of field-frequency pulses and desirably having a peak amplitude at a time in the vicinity of a line-frequency pulse of one of said fields, said generated signal tending to vary from these desirable relationships; means including a resonant circuit coupled to said supply means and tuned to a high harmonic of field frequency and excited by said field-frequency pulses for developing a signal in coincidence with each of said groups of field-frequency pulses and having a peak amplitude at a time in the vicinity of said line-frequency pulse of said one of said fields; means including frequency-control apparatus responsive jointly to said generated signal and said developed coincidence signal for developing a resultant signal and for applying said resultant signal to said generator to maintain said desirable relationships; means for supplying pulse signals substantially synchronously with said line-frequency pulses; and means including a control system jointly responsive to said last-mentioned pulse signals and said generated signal for developing a control effect representative of the time relation of said line-frequency pulses and said groups of field-frequency pulses, thereby to identify each field.

9. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal desirably substantially in coincidence with each of said groups of field-frequency pulses and desirably having a peak amplitude at a time in the vicinity of a line-frequency pulse of one of said fields, said generated signal tending to vary from these desirable relationships; means for supplying gating pulse signals substantially synchronously with said field-frequency pulses; means including a resonant circuit coupled to said supply means and tuned to a high harmonic of field frequency and excited by said field-frequency pulses for developing a signal in coincidence with each of said groups of field-frequency pulses and having a peak amplitude at a time in the vicinity of said line-frequency pulse of said one of said fields; means including frequency-control apparatus responsive jointly to said generated signal, said developed coincidence signal, and said gating pulse signals for developing a resultant signal and for applying said resultant signal to said generator to maintain said desirable relationships; means for supplying pulse signals substantially synchronously with said line-frequency pulses; and means including a control system jointly responsive to said last-mentioned pulse signals and said generated signal for developing a control effect representative of the time relation of said line-frequency pulses and said groups of field-frequency pulses, thereby to identify each field.

10. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal desirably substantially in coincidence with each of said groups of field-frequency pulses and desirably having a peak amplitude at a time in the vicinity of a line-frequency pulse of one of said fields, said generated signal tending to vary from these desirable relationships; means for supplying gating pulse signals of predetermined duration and substantially synchronously with said field-frequency pulses; means including a resonant circuit coupled to said supply means and tuned to a high harmonic of field frequency and excited by said field-frequency pulses for developing a signal in coincidence with each of said groups of field-frequency pulses and having a peak amplitude at a time in the vicinity of said line-frequency pulse of said one of said fields; means including frequency-control apparatus responsive jointly to said generated signal, said developed coincidence signal, and said gating pulse signals for developing only during said duration of said gating pulse signals a resultant signal and for applying said resultant signal to said generator to maintain said desirable relationships; means for supplying pulse signals substantially synchronously with said line-frequency pulses; and means including a control system jointly responsive to said last-mentioned pulse signals and said generated signal for developing a control effect representative of the time relation of said line-frequency pulses and said groups of field-frequency pulses, thereby to identify each field.

11. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal desirably substantially in coincidence with each of said groups of field-frequency pulses and desirably having a peak amplitude at a time in the vicinity of a line-frequency pulse of one of said fields, said generated signal tending to vary from these desirable relationships; means including a frequency-control circuit responsive jointly to said generated signal and said field-frequency pulses for developing a resultant signal and for applying said resultant signal to said generator to maintain said desirable relationships; means for supplying pulse signals substantially synchronously with said line-frequency pulses; means including a signal-combining circuit jointly responsive to said last-mentioned pulse signals and said generated signal for combining said last-mentioned signals to develop a composite signal; and means including a control circuit coupled to said signal-combining circuit for deriving from said composite signal a control effect representative of the time relation of said line-frequency pulses and said groups of field-frequency pulses, thereby to identify each field.

12. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal desirably substantially in coincidence with each of said groups of field-frequency pulses and desirably having a peak amplitude at a time in the vicinity of a line-frequency pulse of one of said fields, said generated signal tending to vary from these desirable relationships; means including a frequency-control circuit responsive jointly to said generated signal and said field-frequency pulses for developing a resultant signal and for applying said resultant signal to said generator to maintain said desirable relationships; means for supplying pulse signals substantially synchronously with said line-frequency pulses; means including a signal-combining circuit including a transformer having a secondary circuit and a primary circuit responsive to said last-mentioned pulse signals and said generated signal for combining said last-mentioned signals to develop in said secondary circuit a composite signal; and means including a control circuit coupled to said transformer for deriving from said composite signal a control effect representative of the time relation of said line-frequency pulses and said groups of field-frequency pulses, thereby to identify each field.

13. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal desirably substantially in coincidence with each of said groups of field-frequency pulses and desirably having a peak amplitude at a time in the vicinity of a line-frequency pulse of one of said fields, said generated signal tending to vary from these desirable relationships; means including a frequency-control circuit responsive jointly to said generated signal and said field-frequency pulses for developing a resultant signal and for applying said resultant signal to said generator to maintain said desirable relationships; means for supplying pulse signals substantially synchronously with said line-frequency pulses; means including a peak detector jointly responsive to said last-mentioned pulse signals and said generated signal for combining said last-mentioned signals to derive a composite signal; and means including a limiter circuit coupled to said peak detector for deriving from said composite signal a control effect representative of the time relation of said line-frequency pulses and said groups of field-frequency pulses, thereby to identify each field.

14. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal desirably substantially in coincidence with each of said groups of field-frequency pulses and desirably having a peak amplitude at a time in the vicinity of a line-frequency pulse of one of said fields, said generated signal tending to vary from these desirable relationships; means for supplying gating pulse signals of predetermined duration and substantially synchronously with said field-frequency pulses; means including a resonant circuit coupled to said supply means and tuned to a high harmonic of field frequency and excited by said field-frequency pulses for developing a signal in coincidence with each of said groups of field-frequency pulses and having a peak amplitude at a time in the vicinity of said line-frequency pulse of said one of said fields; means including frequency-control apparatus responsive jointly to said generated signal, said developed coincidence signal, and said gating pulse signals for developing a resultant signal and for applying said resultant signal to said generator to maintain said desirable relationships; means for supplying pulse signals substantially synchronously with said line-frequency pulses; and means including a control system jointly repsonsive to said last-mentioned pulse signals, said gating pulse signals, and said generated signal only during the duration of said gating pulse signals for developing a control effect representative of the time relation of said line-frequency pulses and said groups of field-frequency pulses, thereby to identify each field.

15. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and and another time relation during interlaced fields; means including a generator for generating a signal desirably substantially in coincidence with each of said groups of field-frequency pulses and desirably having a peak amplitude at a time in the vicinity of a line-frequency pulse of one of said fields, said generated signal tending to vary from these desirable relationships; means including a frequency-control circuit responsive jonitly to said generated signal and said field-frequency pulses for developing a resultant signal and for applying said resultant signal to said generator to maintain said desirable relationships; means for supplying pulse signals substantially synchronously with said line-frequency pulses; means including a peak detector including a cathode having one winding of a transformer connected thereto and another winding of said transformer responsive to said last-mentioned pulse signals and including a control electrode responsive to said generated signal for combining said last-mentioned signals to develop a composite signal having a 30 cycle component; and means including a symmetrical limiter circuit coupled to said peak detector for deriving from said 30 cycle component a 30 cycle square wave representative of the time relation of said line-frequency pulses and said groups of field-frequency pulses, thereby to identify each field.

16. In an odd-line interlaced television system a field-identification system comprising: means for supplying a composite television signal including line-frequency pulses and groups of field-frequency pulses, said groups of field-frequency pulses having one time relation with respect to said line-frequency pulses during one group of fields and another time relation during interlaced fields; means including a generator for generating a signal desirably substantially in coincidence with each of said groups of field-frequency pulses and desirably having a peak amplitude at a time in the vicinity of a line-frequency pulse of one of said fields, said generated signal tending to vary from these desirable relationships; means including a frequency-control circuit responsive jointly to said generated signal and said field-frequency pulses for developing a resultant signal and for applying said resultant signal to said generator to maintain said desirable relationships; means for supplying pulse signals substantially synchronously with said line-frequency pulses; means including a peak detector including a cathode having a winding of a transformer connected thereto, another winding of said transformer being responsive to said last-mentioned pulse signals, and a control electrode responsive to said generated signal for combining said last-mentioned signals to develop a composite signal having a 30 cycles component the crests of which substantially coincide with said one group of fields and the nulls of which substantially coincide with said interlaced fields; and means including a symmetrical limiter circuit coupled to said peak detector for deriving from said 30 cycle component a 30 cycle square wave the positive peaks of which substantially coincide with said one group of fields and the negative peaks of which substantially coincide with said interlaced fields, thereby to identify each field.

References Cited in the file of this patent

UNITED STATES PATENTS 2,630,485 Heikes et al. ............ Mar. 3, 1953